US009786277B2

(12) United States Patent
Rothwell et al.

(10) Patent No.: US 9,786,277 B2
(45) Date of Patent: Oct. 10, 2017

(54) SYSTEM AND METHOD FOR ELICITING OPEN-ENDED NATURAL LANGUAGE RESPONSES TO QUESTIONS TO TRAIN NATURAL LANGUAGE PROCESSORS

(71) Applicant: VoiceBox Technologies Corporation, Bellevue, WA (US)

(72) Inventors: Spencer John Rothwell, Seattle, WA (US); Daniela Braga, Bellevue, WA (US); Ahmad Khamis Elshenawy, Lynnwood, WA (US); Stephen Steele Carter, Seattle, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 15/257,217

(22) Filed: Sep. 6, 2016

(65) Prior Publication Data

US 2017/0068659 A1    Mar. 9, 2017

Related U.S. Application Data

(60) Provisional application No. 62/215,115, filed on Sep. 7, 2015.

(51) Int. Cl.
*G06F 17/00*    (2006.01)
*G06F 21/00*    (2013.01)
(Continued)

(52) U.S. Cl.
CPC ............ *G10L 15/22* (2013.01); *G06F 17/278* (2013.01); *G06F 17/30976* (2013.01); *G06Q 10/10* (2013.01); *G06F 17/273* (2013.01)

(58) Field of Classification Search
None
See application file for complete search history.

(56) References Cited

U.S. PATENT DOCUMENTS 7,197,459 B1    3/2007    Harinarayan
7,912,726 B2 *    3/2011    Alshawi .............. G06F 17/2827
                                                            704/270.1
(Continued)

FOREIGN PATENT DOCUMENTS

WO    2017044368    3/2017
WO    2017044369    3/2017
(Continued)

OTHER PUBLICATIONS

Amazon, "Amazon Mechanical Turk API Reference", API Version Mar. 25, 2012, available at: http://awsdocs.s3.amazonaws.com/MechTurk/20120325/amt-API-20120325.pdf, 234 pages.
(Continued)

*Primary Examiner* — Fariba Sirjani
(74) *Attorney, Agent, or Firm* — Sheppard Mullin Richter & Hampton LLP

(57) ABSTRACT

Systems and methods gathering text commands in response to a command context using a first crowdsourced are discussed herein. A command context for a natural language processing system may be identified, where the command context is associated with a command context condition to provide commands to the natural language processing system. One or more command creators associated with one or more command creation devices may be selected. A first application one the one or more command creation devices may be configured to display command creation instructions for each of the one or more command creators to provide text commands that satisfy the command context, and to display a field for capturing a user-generated text entry to satisfy the command creation condition in accordance with the command creation instructions. Systems and methods for reviewing the text commands using second and crowdsourced jobs are also presented herein.

23 Claims, 9 Drawing Sheets

(51) Int. Cl.
*G10L 15/00* (2013.01)
*G06Q 10/00* (2012.01)
*G10L 15/22* (2006.01)
*G06F 17/27* (2006.01)
*G06F 17/30* (2006.01)
*G06Q 10/10* (2012.01)

(56) References Cited

U.S. PATENT DOCUMENTS

| | | | |
|---|---|---|---|
| 7,966,180 B2 | 6/2011 | Bajaj | |
| 8,731,925 B2* | 5/2014 | Da Palma | G10L 15/06 704/246 |
| 8,805,110 B2 | 8/2014 | Rhoads | |
| 8,847,514 B1 | 9/2014 | Reynoso | |
| 8,849,259 B2 | 9/2014 | Rhoads | |
| 8,855,712 B2 | 10/2014 | Lord | |
| 8,886,206 B2 | 11/2014 | Lord | |
| 8,925,057 B1 | 12/2014 | Ansari | |
| 8,929,877 B2 | 1/2015 | Rhoads | |
| 9,008,724 B2 | 4/2015 | Lord | |
| 9,043,196 B1* | 5/2015 | Leydon | G06F 3/04842 704/4 |
| 9,047,614 B2 | 6/2015 | Kalikivayi | |
| 9,190,055 B1 | 11/2015 | Kiss | |
| 9,361,887 B1* | 6/2016 | Braga | G06Q 10/10 |
| 9,401,142 B1* | 7/2016 | Rothwell | G06Q 50/01 |
| 9,436,738 B2 | 9/2016 | Ehsani | |
| 9,448,993 B1* | 9/2016 | Braga | G06Q 10/10 |
| 9,452,355 B1 | 9/2016 | Lin | |
| 9,519,766 B1 | 12/2016 | Bhosale | |
| 2002/0065848 A1* | 5/2002 | Walker | G06F 17/24 715/205 |
| 2003/0126114 A1* | 7/2003 | Tedesco | G06F 17/30427 |
| 2004/0093220 A1 | 5/2004 | Kirby | |
| 2004/0138869 A1 | 7/2004 | Heinecke | |
| 2005/0108001 A1 | 5/2005 | Aarskog | |
| 2007/0044017 A1* | 2/2007 | Zhu | G06F 17/24 715/209 |
| 2007/0050191 A1 | 3/2007 | Weider | |
| 2007/0100861 A1* | 5/2007 | Novy | G06F 17/21 |
| 2007/0192849 A1 | 8/2007 | Golle | |
| 2007/0198952 A1* | 8/2007 | Pittenger | G06F 17/24 715/853 |
| 2007/0265971 A1 | 11/2007 | Smalley | |
| 2008/0046250 A1* | 2/2008 | Agapi | G10L 15/075 704/275 |
| 2009/0013244 A1* | 1/2009 | Cudich | G06F 17/21 715/234 |
| 2009/0150983 A1 | 6/2009 | Saxena | |
| 2011/0054900 A1* | 3/2011 | Phillips | G10L 15/30 704/235 |
| 2011/0252339 A1* | 10/2011 | Lemonik | G06F 17/2288 715/753 |
| 2012/0066773 A1* | 3/2012 | Weisberger | G06F 21/10 726/29 |
| 2012/0197770 A1* | 8/2012 | Raheja | G06F 17/2258 705/30 |
| 2012/0232907 A1 | 9/2012 | Ivey | |
| 2012/0254971 A1 | 10/2012 | Hu | |
| 2012/0265528 A1 | 10/2012 | Gruber | |
| 2012/0265578 A1 | 10/2012 | Olding | |
| 2012/0284090 A1 | 11/2012 | Marins | |
| 2013/0054228 A1 | 2/2013 | Baldwin | |
| 2013/0231917 A1 | 9/2013 | Naik | |
| 2013/0253910 A1* | 9/2013 | Turner | G06F 17/274 704/9 |
| 2013/0262114 A1 | 10/2013 | Brockett | |
| 2013/0289994 A1* | 10/2013 | Newman | G10L 15/22 704/254 |
| 2013/0304454 A1 | 11/2013 | Kimberly | |
| 2013/0325484 A1* | 12/2013 | Chakladar | G10L 15/26 704/275 |
| 2014/0067451 A1 | 3/2014 | Balamurugan | |
| 2014/0156259 A1* | 6/2014 | Dolan | G06F 17/28 704/9 |
| 2014/0167931 A1* | 6/2014 | Lee | G08C 17/02 340/12.5 |
| 2014/0193087 A1 | 7/2014 | Conwell | |
| 2014/0196133 A1 | 7/2014 | Shuster | |
| 2014/0244254 A1* | 8/2014 | Ju | G10L 15/22 704/243 |
| 2014/0249821 A1 | 9/2014 | Kennewick | |
| 2014/0279780 A1 | 9/2014 | Dasgupta | |
| 2014/0304833 A1 | 10/2014 | Gujar | |
| 2014/0358605 A1 | 12/2014 | Balamurugan | |
| 2015/0006178 A1 | 1/2015 | Peng | |
| 2015/0095031 A1 | 4/2015 | Conkie | |
| 2015/0120723 A1 | 4/2015 | Deshmukh | |
| 2015/0128240 A1* | 5/2015 | Richards | H04L 63/0861 726/7 |
| 2015/0154284 A1 | 6/2015 | Pfeifer | |
| 2015/0169538 A1* | 6/2015 | Reynolds | G06Q 10/10 704/9 |
| 2015/0213393 A1 | 7/2015 | O'Neill | |
| 2015/0269499 A1* | 9/2015 | B | G06Q 10/06398 705/7.42 |
| 2015/0278749 A1 | 10/2015 | Bhagat | |
| 2015/0339940 A1 | 11/2015 | Aggarwal | |
| 2015/0341401 A1* | 11/2015 | Lee | H04L 65/403 715/753 |
| 2016/0012020 A1 | 1/2016 | George | |
| 2016/0048486 A1* | 2/2016 | Lopategui | G06F 17/2288 715/229 |
| 2016/0048934 A1 | 2/2016 | Gross | |
| 2016/0285702 A1* | 9/2016 | Beausoleil | G06F 3/04842 |
| 2016/0329046 A1* | 11/2016 | Gross | G10L 15/22 |
| 2016/0342898 A1 | 11/2016 | Ehsani | |
| 2017/0017779 A1* | 1/2017 | Huang | G06F 21/16 |
| 2017/0039505 A1 | 2/2017 | Prabhakara | |
| 2017/0068651 A1 | 3/2017 | Rothwell | |
| 2017/0068656 A1 | 3/2017 | Braga | |
| 2017/0068809 A1 | 3/2017 | Bhosale | |
| 2017/0069039 A1 | 3/2017 | Kennewick | |
| 2017/0069325 A1 | 3/2017 | Braga | |
| 2017/0069326 A1 | 3/2017 | Rothwell | |

FOREIGN PATENT DOCUMENTS

| | | |
|---|---|---|
| WO | 2017044370 | 3/2017 |
| WO | 2017044371 | 3/2017 |
| WO | 2017044408 | 3/2017 |
| WO | 2017044409 | 3/2017 |
| WO | 2017044415 | 3/2017 |

OTHER PUBLICATIONS

Amazon, "Amazon Mechanical Turk Developer Guide", API Version Mar. 25, 2012, available at: http://awsdocs.s3.amazonaws.com/MechTurk/20120325/amt-dgi-20120325.pdf, 43 pages.

Amazon, "Amazon Mechanical Turk Getting Started Guide", API Version Mar. 25, 2012, available at http://awsdocs.s3.amazonaws.com/MechTurk/20120325/amt-gsg-20120325.pdf, 36 pages.

Amazon, "Amazon Mechanical Turk Requester UI Guide", API Version Mar. 25, 2012, available at http://awsdocs.s3.amazonaws.com/MechTurk/20120325/amt-ui-20120325.pdf, 59 pages.

Badenhorst, Jaco, et al., "Quality Measurements for Mobile Data Collection in the Developing World", SLTU, 2012, 7 pages.

Bontcheva, Kalina, et al. "Crowdsourcing Named Entity Recognition and Entity Linking Corpora", Handbook of Linguistic Annotation, Springer, 2014, 18 pages.

Braunschweig, Katrin, et al., "Enhancing Named Entity Extraction by Effectively Incorporating the Crowd", BTW Workshops, 2013, pp. 181-195.

Buchholz, Sabine, et al., "Crowdsourcing Preference Tests, and How to Detect Cheating", in INTERSPEECH 2011, 8 pages.

Callison-Burch, Chris, et al., "Creating speech and language data with Amazon's Mechanical Turk", Proceedings of the NAACL HLT 2010 Workshop on Creating Speech and Language Data with

(56) References Cited

OTHER PUBLICATIONS

Amazon's Mechanical Turk, Association for Computational Linguistics, 2010, 12 pages.
Carmel, David, et al., "ERD'14: Entity Recognition and Disambiguation Challenge", ACM SIGIR Forum, vol. 48, No. 2, 2014, pp. 63-77.
De Vries, Nic J., et al., "A Smartphone-Based ASR Data Collection Tool for Under-Resourced Languages", Speech Communication, vol. 56, 2014, pp. 119-131.
Derczynski, Leon, et al., "Analysis of Named Entity Recognition and Linking for Tweets", Information Processing & Management, vol. 51, No. 2, 2015, pp. 32-49.
Draxler, Christoph, "Interfaces for Crowdsourcing Platforms", from "Crowdsourcing for Speech Processing: Applications to Data Collection, Transcription, and Assessment", Chapter 9, pp. 241-278, John Wiley & Sons, 2013, 48 pages.
Eickhoff, C. et al., "Increasing Cheat Robustness of Crowdsourcing Tasks", Information Retrieval, vol. 16, No. 2, 2013, 18 pages.
Eickhoff, Carsten, "How Crowdsourcable is Your Task?", Proceedings of the Workshop on Crowdsourcing for Search and Data Mining, Feb. 9, 2011, pp. 11-14.
Finin, Tim, et al., "Annotating Named Entities in Twitter Data With Crowdsourcing", Proceedings of the NAACL HLT 2010 Workshop on Creating Speech and Language Data With Amazon's Mechanical Turk, Association for Computational Linguistics, Jun. 2010, pp. 80-88.
Freitas, Joao, et al., "Crowd-sourcing Platform for Large-Scale Speech Data Collection", Proc. FALA, 2010, 4 pages.
Gadiraju, Ujwal, et al., "Understanding Malicious Behavior in Crowdsourcing Platforms: The Case of Online Surveys", CHI 2015—Conference on Human Factors in Computing Systems, Seoul, South Korea, Apr. 18, 2015, 10 pages.
Gennaro, Rosario, et al., "Non-Interactive Verifiable Computing: Outsourcing Computation to Untrusted Workers", Advances in Cryptology—CRYPTO 2010, Springer Berlin Heidelberg, 2010, 19 pages.
Hsueh, Pei-Yun, et al., "Data Quality from Crowdsourcing: A Study of Annotation Selection Criteria", Proceedings of the NAACL HLT Workshop on Active Learning for Natural Language Processing, Boulder, Colorado, Jun. 2009, pp. 27-35.
Hughes, Thad, et al., "Building Transcribed Speech Corpora Quickly and Cheaply for Many Languages", INTERSPEECH, 2010, 4 pages.
Ipeirotis, Panagiotis G., "Quality Management on Amazon Mechanical Turk", Proceedings of the ACM SIGKDD Workshop on Human Computation, ACM, Jul. 2010, pp. 64-67.
Kaufmann, Nicolas, et al., "More Than Fun and Money. Worker Motivation in Crowdsourcing—A Study on Mechanical Turk", Proceedings of the Seventeenth Americas Conference on Information Systems, AMCIS, vol. 11, Aug. 4, 2011, pp. 1-11.
Lawson, Nolan, et al., "Annotation Large Email Datasets for Named Entity Recognition with Mechanical Turk", Proceedings of the NAACL HLT 2010 Workshop on Creating Speech and Language Data With Amazon's Mechanical Turk, Association for Computational Linguistics, Jun. 2010, pp. 71-79.
Levenshtein, V., I., Binary Codes Capable of Correcting Deletions, Insertions, and Reversals, Soviet Physics—Doklady, vol. 10, No. 8, Feb. 1966, pp. 707-710.
Liu, Sean, et al., "A Collective Data Generation Method for Speech Language Models", Spoken Language Technology Workshop (SLT), 2010 IEEE, IEEE, 2010, 6 pages.
McGraw, "Collecting Speech from Crowds", from "Crowdsourcing for Speech Processing: Applications to Data Collection, Transcription, and Assessment", Chapter 3, pp. 37-71, John Wiley & Sons, 2013, 44 pages.
McGraw, Ian Carmichael, "Crowd-Supervised Training of Spoken Language Systems", Dissertation, Massachusetts Institute of Technology, 2012, 166 pages.
McGraw, Ian, et al., "Collecting Voices from the Cloud", LREC, 2010, 8 pages.
McGraw, Ian, et al., "How to Control and Utilize Crowd-Collected Speech", from "Crowdsourcing for Speech Processing: Applications to Data Collection, Transcription, and Assessment", Chapter 5, pp. 106-136, John Wiley & Sons, 2013, 40 pages.
Oleson, David, et al., "Programmatic Gold: Targeted and Scalable Quality Assurance in Crowdsourcing", Human Computation, Papers from the 2011 AAAI Workshop (WS-11-11), vol. 11, 2011, 6 pages.
Rutherford, Attapol T., et al., "Pronunciation Learning for Named-Entities Through Crowd-Sourcing", Proceedings of the 15th Annual Conference on the International Speech Communication Association, 2015, 5 pages.
Sabou, M. et al., "Crowdsourcing Research Opportunities: Lessons from Natural Language Processing", iKnow 2012—Proceedings of the 12th International Conference on Knowledge Management and Knowledge Technologies, Graz, Austria, Article 17, Sep. 5, 2012, 8 pages.
Sabou, Marta, et al., "Corpus Annotation through Crowdsourcing: Towards Best Practice Guidelines", Proceedings of the 9th International Conference on Language Resources and Evaluation, Reykjavik, Iceland, 2014, 8 pages.
Soleymani, Mohammad, et al., "Crowdsourcing for Affective Annotation of Video: Development of a Viewer-Reported Boredom Corpus", Proceedings of the ACM SIGIR 2010 Workshop on Crowdsourcing for Search Evaluation, Jul. 19, 2010, pp. 4-8.
Suzic, Sinisa, et al., "On the Realization of AnSpeechCollector, System for Creating Transcribed Speech Database", 2014, 4 pages.
Voyer, Robert, et al., "A Hybrid Model for Annotating Named Entity Training Corpora", Proceedings of the Fourth Linguistic Annotation Workshop, Association for Computational Linguistics, Jul. 15, 2010, pp. 243-246.
Wang, Gang, et al., Serf and Turf: Crowdturfing for Fun and Profit, Proceedings of the WWW, New York, Apr. 16, 2012, pp. 679-688.

\* cited by examiner

SYSTEM AND METHOD FOR ELICITING OPEN-ENDED NATURAL LANGUAGE RESPONSES TO QUESTIONS TO TRAIN NATURAL LANGUAGE PROCESSORS

RELATED APPLICATIONS

This application claims priority to U.S. Provisional Patent Application No. 62/215,115, entitled "SYSTEM AND METHOD FOR ELICITING OPEN-ENDED NATURAL LANGUAGE RESPONSES TO QUESTIONS TO TRAIN NATURAL LANGUAGE PROCESSORS," filed on Sep. 7, 2015, which is incorporated by reference herein in its entirety. This application is related to co-pending PCT application No. PCT/US16/50389, entitled "SYSTEM AND METHOD FOR ELICITING OPEN-ENDED NATURAL LANGUAGE RESPONSES TO QUESTIONS TO TRAIN NATURAL LANGUAGE PROCESSORS," filed concurrently herewith, which is incorporated by reference herein in its entirety.

FIELD OF THE INVENTION

The field of the invention generally relates to gathering and reviewing text commands related to the command contexts unmanaged crowds to train natural language processing systems to recognize text commands for one or more command contexts.

BACKGROUND OF THE INVENTION

By translating voice data into text, speech recognition has played an important part in many Natural Language Processing (NLP) technologies. For instance, speech recognition has proven useful to technologies involving vehicles (e.g., in-car speech recognition systems), technologies involving health care, technologies involving the military and/or law enforcement, technologies involving telephony, and technologies that assist people with disabilities. Speech recognition systems are often trained and deployed to end-users.

The end-user deployment phase typically includes using a trained acoustic model to identify text in voice data provided by end-users. The training phase typically involves training an acoustic model in the speech recognition system to recognize text in voice data. The training phase often includes capturing voice data, transcribing the voice data into text, and storing pairs of voice data and text in transcription libraries. Capturing voice data in the training phase typically involves collecting different syllables, words, and/or phrases commonly used in speech. Depending on the context, these utterances may form the basis of commands to a computer system, requests to gather information, portions of dictations, or other end-user actions.

Conventionally, NLP systems captured voice data using teams of trained Natural Language Processing (NLP) trainers who were housed in a recording studio or other facility having audio recording equipment therein. The voice data capture process often involved providing the NLP trainers with a list of utterances, and recording the utterances using the audio recording equipment. Teams of trained transcribers in dedicated transcription facilities typically listened to the utterances, and manually transcribed the utterances into text.

Though useful, conventional NLP systems have problems accommodating the wide variety of utterances present in a given language. More specifically, different NLP end-users may provide different commands to perform similar tasks. As an example, it is often difficult to train an NLP system to recognize the different pronunciations, syntaxes, word orders, etc. that that different NLP end-users use when requesting an NLP system to perform a specific task. It would be desirable to provide systems and methods that accurately and cost-effectively collect and store the utterances NLP end-users are likely to use for a command context.

SUMMARY OF THE INVENTION

Systems and methods for generating entity level annotated text utterances using unmanaged crowds are described herein. Utterances are then used to build state-of-the-art Named Entity Recognition (NER) models, used for natural language processing systems (e.g., dialogue systems). In some implementations, a wide variety of raw utterances are collected through a variant elicitation task. The relevance of these utterances may be verified by feeding these utterances back to a second crowd for a domain validation task. Utterances with potential spelling errors may be flagged; these errors may be verified with review by the second crowd before discarding these errors. These techniques, combined with a periodic non-machine readable tasks (e.g., CAPTCHA captions and/or non-machine readable sound bites) may assist in preventing automated responses, and allow for the collection of high quality text utterances despite the inability to use the traditional gold test question approach for spam filtering. The utterances may be tagged with appropriate NER labels using unmanaged crowds.

Systems and methods for collecting text variants may define scenarios that are to be represented within a collection. Scenarios may be based upon what a given product is designed to support and are intended to provoke responses from workers in the crowd that simulate what a real user would say when using a particular voice recognition product.

Once the scenarios are defined, the system may present scenarios to users (e.g., users in an unmanaged crowd). Such scenarios may be presented through a crowdsourcing platform. The scenarios give the users context pertaining to the kind of product they are (hypothetically) using and the worker is asked to write a text command (variant) as if they were asking a voice recognition enabled personal assistant to perform a certain specified function. For example, the system may be used to collect variations of commands that might be used to turn off a device. In this example, the system may generate a job that asks users in the crowd: "Imagine you have just finished using the device. Think of two ways you might speak to the device to turn it off."

The system may score a given response based on the number of users in the crowd that provided the given response. For instance, 600 users may respond with the command "shut down." 200 users may respond with the command "turn off" Lesser numbers of users may provide different responses. The system may determine that "shut down" and "turn off" are common responses (and therefore score them in a particular manner). In some instances, if a particular response (e.g., "shut down") dominates over others is predominantly (e.g., based on a percentage of the particular response exceeding a predefined threshold), then the system may no longer allow other users to provide the same response. This may be to elicit a variety of different responses, other than the dominant response (or dominant responses).

At any rate, once the variants have been collected, the system may perform a number of spellchecking stages. For example, the system may run the collected variants through an automated spellchecker. Variants are flagged during this process but not thrown out. The system may deploy another crowdsourcing job in which users are asked to identify whether an utterance really contains a spelling error for the variants that were flagged by the automatic spellchecker. If a variant is found to contain an error, it may be discarded.

After variants have been processed through the spell-checking stage, the system may perform a domain-validation those variants. During domain-validation, the system may employ a crowdsourcing jobs in which the variants are displayed alongside several golden variants, which were a representative sample of relevant responses to the original scenarios that were presented to users during the previous elicitation phase. Users in the crowd are asked to decide whether the variant being evaluated belongs with the group of golden variants. This strategy allows untrained users in the crowd to accurately match responses to domains without having to explicitly describe the constraints of that domain to the user. It is easier for an untrained worker to decide whether a variant is similar to a collection of domain appropriate variants than it is for a worker to explicitly learn and apply the constraints of that domain.

Systems and methods gathering text commands in response to a command context using a first crowdsourced are discussed herein. A command context for a natural language processing system may be identified, where the command context is associated with a command context condition to provide commands to the natural language processing system. One or more command creators associated with one or more command creation devices may be selected. A first application one the one or more command creation devices may be configured to display command creation instructions for each of the one or more command creators to provide text commands that satisfy the command context, and to display a field for capturing a user-generated text entry to satisfy the command creation condition in accordance with the command creation instructions. Systems and methods for reviewing the text commands using second and crowdsourced jobs are also presented herein.

In an implementation, the first application is configured to display a plurality of command contexts, and to capture, for each of the plurality of command contexts, a plurality of user-generated text entries.

Configuring the first application may comprise periodically displaying a non-machine readable caption on the first application. The non-machine readable caption may comprise one or more of a non-machine readable image and a non-machine readable sound bite.

In some implementations, one or more command reviewers associated with one or more command reviewer devices may be selected; and a second application on the one or more command reviewer devices may be configured with command review instructions for the one or more command reviewers to review the user-generated text entry. The command review instructions may instruct the one or more command reviewers to review the syntax of the user-generated text entry. The command review instructions may instruct the one or more command reviewers to compare the user-generated text entry with model text language variants for the command context. The second application may be configured to display the user-generated text entry and the command context alongside the model text language variants, and to receive a selection from the one or more command reviewers whether the user-generated text entry is as similar to command context condition as one of the model text language variants.

In various implementations, syntax of the user-generated text entry may be checked. Moreover, the user-generated text entry may be stored in a transcription library. The user-generated text entry may be used for transcription of voice data during an end-user deployment phase of the natural language processing system.

These and other objects, features, and characteristics of the system and/or method disclosed herein, as well as the methods of operation and functions of the related objects of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Example of a System Architecture

The Structures of the Natural Language Processing Environment 100

Figure 1:
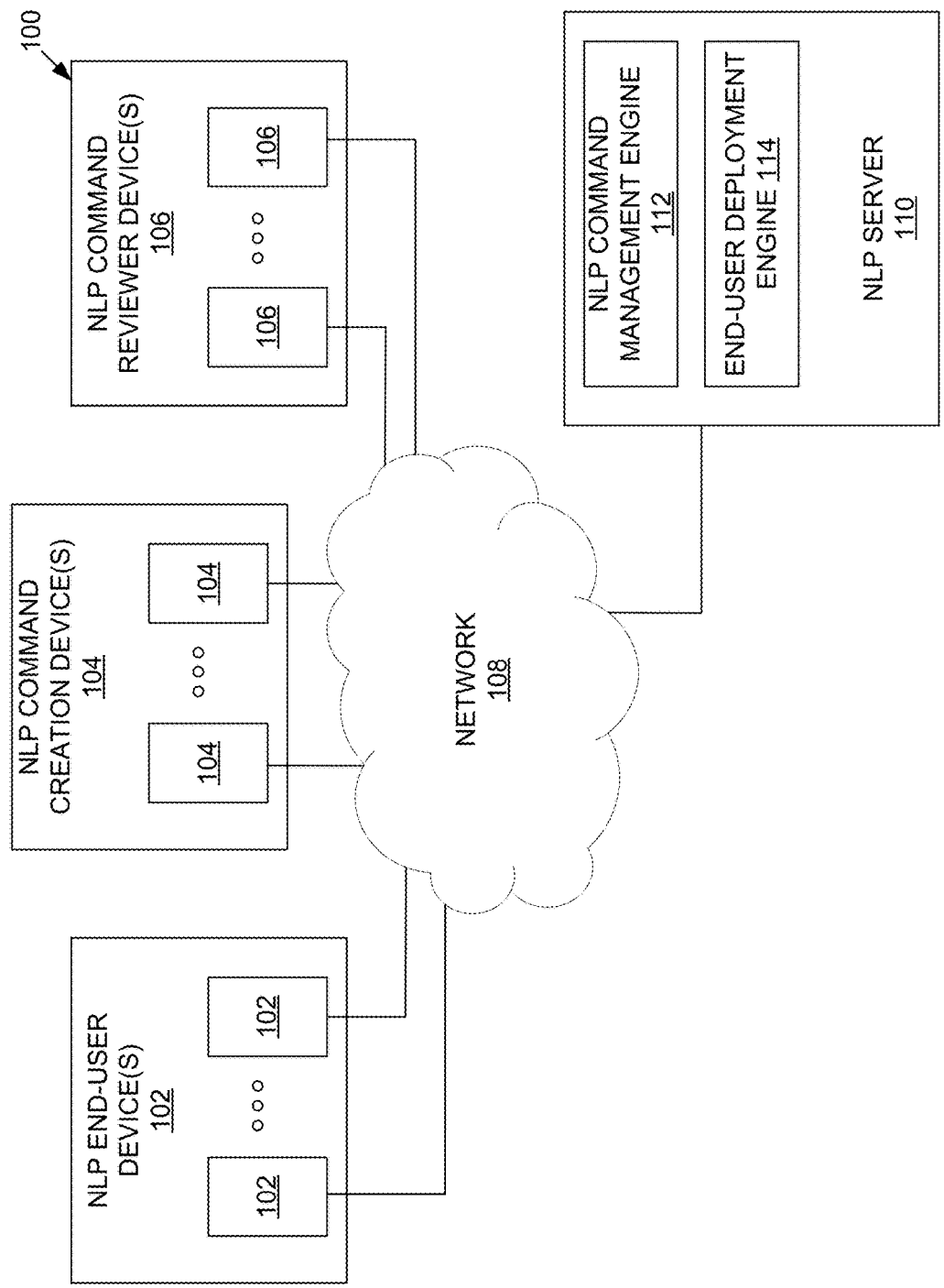
FIG. 1 illustrates a block diagram of a natural language processing environment, according to some implementations.

FIG. 1 illustrates a block diagram of a natural language processing environment 100, according to some implementations. The natural language processing environment 100 may include Natural Language Processing (NLP) end-user device(s) 102, NLP command creation device(s) 104, NLP command receiver device(s) 106, and a NLP server 110. The NLP end-user device(s) 102, the NLP command creation device(s) 104, the NLP command receiver device(s) 106, and the NLP server 110 are shown coupled to the network 108. Though FIG. 1 shows the NLP end-user device(s) 102, the NLP command creation device(s) 104, the NLP command reviewer device(s) 106, and the NLP server 110 as distinct sets of devices, it is noted that in various implementations, one or more of the NLP end-user device(s) 102, the NLP command creation device(s) 104, the NLP command reviewer device(s) 106, and the NLP server 110 may reside on a common set of devices.

The NLP end-user device(s) 102 may include one or more digital devices configured to provide an end-user with natural language transcription services. A "natural language transcription service," as used herein, may include a service that converts audio contents into a textual format. A natural language transcription service may recognize words in audio contents, and may provide an end-user with a textual representation of those words. The natural language transcription service may be incorporated into an application, process, or run-time element that is executed on the NLP end-user device(s) 102. In an implementation, the natural language transcription service is incorporated into a mobile application that executes on the NLP end-user device(s) 102 or a process maintained by the operating system of the NLP end-user device(s) 102. In various implementations, the natural language transcription service may be incorporated into applications, processes, run-time elements, etc. related to technologies involving vehicles, technologies involving health care, technologies involving the military and/or law enforcement, technologies involving telephony, technologies that assist people with disabilities, etc. The natural language transcription service may be supported by the NLP command creation device(s) 104, the NLP command reviewer device(s) 108, and the NLP server 110, as discussed further herein.

The NLP end-user device(s) 102 may include components, such as memory and one or more processors, of a computer system. The memory may further include a physical memory device that stores instructions, such as the instructions referenced herein. The NLP end-user device(s) 102 may include one or more audio input components (e.g., one or more microphones), one or more display components (e.g., one or more screens), one or more audio output components (e.g., one or more speakers), etc. In some implementations, the audio input components of the NLP end-user device(s) 102 may receive audio content from an end-user, the display components of the NLP end-user device(s) 102 may display text corresponding to transcriptions of the audio contents, and the audio output components of the NLP end-user device(s) 102 may play audio contents to the end-user. It is noted that in various implementations, however, the NLP end-user device(s) 102 need not display transcribed audio contents, and may use transcribed audio contents in other ways, such as to provide commands that are not displayed on the NLP end-user device(s) 102, use application functionalities that are not displayed on the NLP end-user device(s) 102, etc. The NLP end-user device(s) 102 may include one or more of a networked phone, a tablet computing device, a laptop computer, a desktop computer, a server, or some combination thereof.

The NLP command creation device(s) 104 may include one or more digital device configured to provide NLP command creators with command contexts to and receive text commands in response to those command contexts. An "NLP command creator," as used herein, may refer to a person who creates text commands for command contexts using a mobile application executing on the NLP command creation device(s) 104. In various implementations, NLP command creators need not be trained (e.g., may be part of an unmanaged crowd) in providing text commands in response to command contexts. NLP command creators may be compensated (e.g., with incentives, points, virtual currencies, real currencies, etc.) for completing a specified number of jobs.

A "command context," as used herein, may refer to a scenario (e.g., a set of conditions) that an NLP end-user uses the a natural language transcription service for. Examples of command contexts include contexts related to controlling the NLP end-user device(s) 104 (e.g., controlling an application, process, device, etc. using voice data), contexts related to document generation and/or document editing (e.g., dictation tasks, etc.), and contexts related to searching documents and/or network resources (e.g., using voice data to perform Internet searches, etc.). A "text command," as used herein, may refer to utterances (syllables, words, phrases, combinations of phrases, etc.) used by an NLP end-user within a specific command context. As an example, a text command related to a command context of Internet searches may include the word "search" (or variants thereof) followed by a sequence of words that provide parameters for the search. As another example, a text command related to controlling a vehicle may include the word "go" (or variants thereof) followed by a sequence of words that provide parameters for directions, speeds, etc.

The NLP command creation device (s) 104 may include components, such as memory and one or more processors, of a computer system. The memory may further include a physical memory device that stores instructions, such as the instructions referenced herein. The NLP command creation device (s) 104 may include one or more audio input components (e.g., one or more microphones), one or more display components (e.g., one or more screens), one or more audio output components (e.g., one or more speakers), etc. The NLP command creation device (s) 104 may support a mobile application, process, etc. that is used to capture text commands during the training phase of the natural language processing environment 100. The mobile application on the NLP command creation device(s) 104 may display on a screen a command context and a request to provide text commands related to that command context. The NLP command creation device (s) 104 may include one or more of a networked phone, a tablet computing device, a laptop computer, a desktop computer, a server, or some combination thereof.

The NLP command reviewer device(s) 106 may include one or more digital devices configured to provide NLP command reviewers with the ability to review whether text commands provided by the NLP command creation device(s) 104 are similar to model text commands for a command context. In some implementations, the NLP command reviewer device(s) 106 provide NLP command reviewers with the ability to verify the accuracy of text commands provided by the NLP command creation device(s) 104 by checking syntax (spelling, grammar, etc.) of the text commands provided by the NLP command creation device(s) 104. In various implementations, NLP command reviewers need not be trained (e.g., may be part of an unmanaged crowd) in reviewing text commands, but rather may comprise ordinary users of the NLP command reviewer device(s) 106. NLP command reviewers may be compensated (e.g., with incentives, points, virtual currencies, real currencies, etc.) for completing a specified number of jobs.

The NLP command reviewer device(s) 106 may include components, such as memory and one or more processors, of a computer system. The memory may further include a physical memory device that stores instructions, such as the instructions referenced herein. The NLP command reviewer device(s) 106 may include one or more audio input components (e.g., one or more microphones), one or more display components (e.g., one or more screens), one or more audio output components (e.g., one or more speakers), etc. The NLP command reviewer device(s) 106 may support a mobile application, process, etc. that is used to review text commands during the training phase of the natural language processing environment 100. The NLP command creation device (s) 104 may include one or more of a networked phone, a tablet computing device, a laptop computer, a desktop computer, a server, or some combination thereof.

The network 108 may comprise any computer network. The network 108 may include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. In various implementations, the network 108 may be implemented as a computer-readable medium, such as a bus, that couples components of a single computer together. For illustrative purposes, it is assumed the network 108 broadly includes, as understood from relevant context, anything from a minimalist coupling of the components illustrated in the example of FIG. 1, to every component of the Internet and networks coupled to the Internet.

In various implementations, the network 108 may include technologies such as Ethernet, 802.11, worldwide interoperability for microwave access (WiMAX), 3G, 4G, CDMA, GSM, LTE, digital subscriber line (DSL), etc. The network 108 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 108 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In some implementations, the network 108 comprises secure portions. The secure portions of the network 108 may correspond to a networked resources managed by an enterprise, networked resources that reside behind a specific gateway/router/switch, networked resources associated with a specific Internet domain name, and/or networked resources managed by a common Information Technology ("IT") unit.

The NLP server 110 may include one or more digital devices configured to support natural language transcription services. The NLP server 110 may include a an NLP command management engine 112 and an end-user deployment engine 114.

The NLP command management engine 112 may manage collection from the NLP command creation device(s) 104 of text commands for one or more command contexts. The NLP command management engine 112 may also manage review by the NLP command reviewer device(s) 106 of text commands provided for the command contexts. In some implementations, the NLP command management engine 112 selects NLP command creators for a first crowdsourced job. The first crowdsourced job may provide NLP command creators with a command context, and may request the NLP command creators to provide text commands used for the command context.

In various implementations, the NLP command management engine 112 selects a first group of NLP command reviewers for a second crowdsourced job, and a second group of NLP command reviewers for a third crowdsourced job. The second crowdsourced job may comprise a request to review syntax (spelling, grammar, etc.) of text commands provided in response to the first crowdsourced job. The third crowdsourced job may comprise requesting the second group of NLP command reviewers to determine whether text commands are similar to model text commands for a specific command context. In some implementations, the NLP command management engine 112 provides the NLP command reviewer device(s) 106 with a menu that displays a command context, text commands for the command context provided by one of the NLP command creation device(s) 104, and model text commands for the command context. The menu may allow an NLP command reviewer to select whether or not the text commands provided by the NLP command creation device(s) 104 is similar to any of the model text commands.

The end-user deployment engine 114 may provide natural language transcription services to the NLP end-user device(s) 102 during an end-user deployment phase of the natural language processing environment 100. In various implementations, the end-user deployment engine 114 uses a transcription data datastore. Transcriptions in the transcription data datastore may have been initially generated during the transcription phase. The transcriptions in the transcription data store may comprise, for instance, text commands for a specific command context generated by the NLP command management engine 112 during the training phase of the natural language processing environment 100.

The Structures of the NLP Command Management Engine 112

Figure 2:
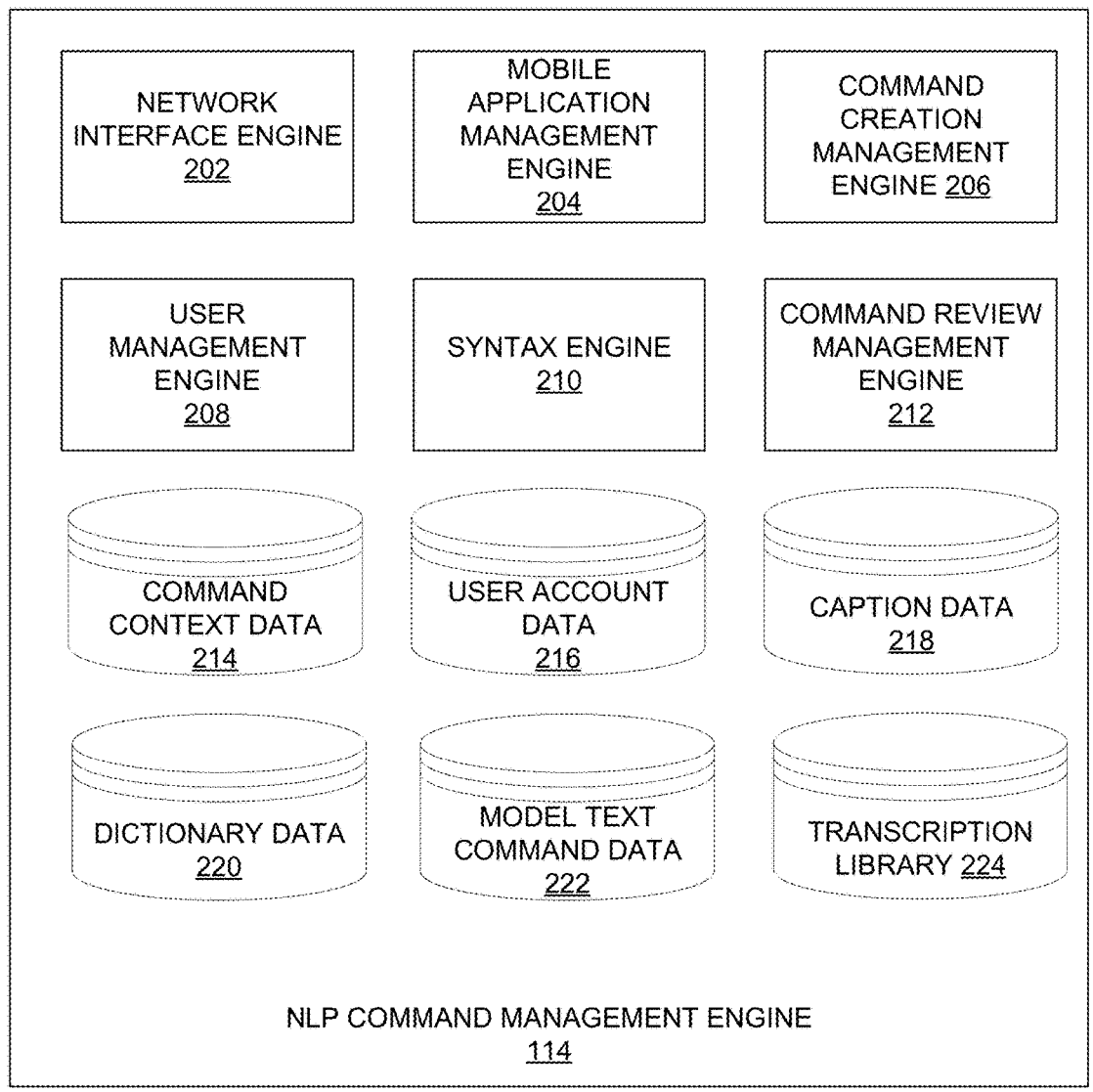
FIG. 2 illustrates a block diagram of an NLP command management engine, according to some implementations.

FIG. 2 illustrates a block diagram of an NLP command management engine 112, according to some implementations. The NLP command management engine 112 may include a network interface engine 202, a mobile application management engine 204, a command creation management engine 206, a user management engine 208, a syntax engine 210, a command review management engine 212, a command context data datastore 214, a user account data datastore 216, a caption data datastore 218, a dictionary data datastore 220, a model text command data datastore 222, and a transcription library 224. One or more of the network interface engine 202, the mobile application management engine 204, the command creation management engine 206, the user management engine 208, the syntax engine 210, the command review management engine 212, the command context data datastore 214, the user account data datastore 216, the caption data datastore 218, the dictionary data datastore 220, the model text command data datastore 222, and the transcription library 224 may be coupled to one another or to modules not shown in FIG. 2.

The network interface engine 202 may be configured to send data to and receive data from the network 108. In some implementations, the network interface engine 202 is implemented as part of a network card (wired or wireless) that supports a network connection to the network 108. The network interface engine 202 may control the network card and/or take other actions to send data to and receive data from the network 108.

The mobile application management engine 204 may be configured to manage a mobile application on the NLP command creation device(s) 104 and the NLP command reviewer device(s) 106. The mobile application management engine 204 may provide installation instructions (e.g., an executable installation file, a link to an application store, etc.) to the NLP command creation device(s) 104 and/or the NLP command reviewer device(s) 106. The mobile application management engine 204 may further instruct a mobile application on the NLP command creation device(s) 104 to render one or more screens that provide NLP command creators with command contexts and request from the NLP command creators text commands corresponding to the command contexts. As an example, the screens may include a text display box that specifies a command context, and a text input box that receives from the NLP command creators text commands for the command context.

In some implementations, the mobile application management engine 204 instructs a mobile application on the NLP command reviewer device(s) 106 to render one or more screens that allow NLP command reviewers to review syntax of text commands. The mobile application management engine 204 may also instruct the mobile application on the NLP command reviewer device(s) 106 to render one or more screens that allow NLP command reviewers to determine whether an NLP command creator's text commands are similar to model text commands for a command context. In various implementations, for instance, the mobile application may display an NLP command creator's text command alongside model text commands for a specified command context. The mobile application may allow NLP command reviewers to select whether the NLP command creator's text command is similar to one or more of the model text commands. In various implementations, the mobile application does not require NLP command reviewers to specify the reasons the NLP command NLP command creator's text command is similar to one or more of the model text commands. Such implementations may present advantages to reviewing text commands, as untrained NLP command reviewers with an intuitive grasp of a language may know a text command represents a command context, but may not know the reason for the similarity to model text commands.

The command creation management engine 206 may manage instructions to the NLP command creation device(s) 104 to create text commands. In some implementations, the command creation management engine 206 creates crowdsourced jobs that provide the NLP command creation device(s) 104 with command contexts using command context data from the command context data datastore 214. The command creation management engine 206 may also select specific NLP command creators with user account data, e.g., user account data gathered from the user account data datastore 216 by the user management engine 208. The command creation management engine 206 may instruct the mobile application management engine 204 to deploy relevant crowdsourced jobs to the NLP command creation device(s) 104.

The user management engine 208 may gather user account data from the user account data datastore 216. In various implementations, the user management engine 208 selects NLP command creators for crowdsourced jobs related to NLP command creation. The user management engine 208 may also select NLP command reviewers for crowdsourced jobs related to command review processes. The user management engine 208 may provide user account data to the other modules of the NLP command management engine 112, such as the mobile application management engine 204.

The syntax engine 210 may evaluate syntax of text strings. In various implementations, the syntax engine 210 compares text commands with syntax in the dictionary to check spelling, grammar, and other attributes of the text commands. The syntax engine 210 may gather relevant reference syntax from the dictionary data datastore 220.

The command review management engine 212 may manage instructions to the NLP command review device(s) 106 to review text commands. In some implementations, the command review management engine 212 creates crowdsourced jobs that provide the NLP command review device(s) 106 with instructions to check syntax of text commands provided by NLP command creators. The command review management engine 212 may further remove specific text commands that NLP command reviewers have indicated should be removed (e.g., text commands that do not comply with syntax requirements, etc.). In some implementations, the command review management engine 212 creates crowdsourced jobs that request NLP command reviewers to compare text commands provided by NLP command creators with model text language variants for a specific command context. To this end, the command review management engine 212 may gather from the model text command data datastore 222 model text language variants for NLP command reviewers to compare with text commands provided by NLP command creators. The command review management engine 212 may further implement comparison thresholds between model text language variants and text commands provided by NLP command creators. The command review management engine 212 may store particular text commands provided by NLP command creators (e.g., those text commands provided by NLP command creators that have passed review of NLP command reviewers) in the transcription library 224.

The command creation management engine 206 may also select specific NLP command creators with user account data, e.g., user account data gathered from the user account data datastore 216 by the user management engine 208. The command creation management engine 206 may instruct the mobile application management engine 204 to deploy relevant crowdsourced jobs to the NLP command creation device(s) 104.

The command context data datastore 214 may store command context data. "Command context data," as used herein, may refer to a data structure representative of one or more command contexts for the natural language processing environment 100. In some implementations, the command context data is indexed, ordered, etc. by a text string that represents a relevant command context. The command context data may be grouped into command context groups, where each command context group comprises similar command contexts.

The user account data datastore 216 may store user account data related to NLP command creators and NLP command reviewers. User account data may include usernames, first names, last names, email addresses, phone numbers, etc. In some implementations, the user account data includes user identifiers used to identify the NLP command creators and/or NLP command reviewers within the mobile application managed by the mobile application management engine 204.

The caption data datastore 218 may store non-machine readable captions. A "non-machine readable caption," as used herein, may include an image of text, a soundbite of audio, etc. that is not readable by an automated computer (e.g., by a spambot or other bot, etc.). An example of a non-machine readable caption is a CAPTCHA caption or audio-challenge that requires a human being to interpret. The caption data may be used as part of a first crowdsourcing job, as discussed further herein.

The dictionary data datastore 220 may store a dictionary of appropriate syntax for text commands. The dictionary data datastore 220 may include the words and/or the variants of words commonly used in a particular language. The dictionary data datastore 220 may also include commonly occurring phrases and/or variants of phrases commonly used in a particular language. The dictionary data datastore 220 may be updated at a specified interval (periodically) or by an administrator of the NLP command management engine 112.

The model text command data datastore 222 may store model text commands. Each model text command may comprise text commands an end-user may provide in response to a command context. In some implementations, the model text commands are written by an administrator or other user who manages the NLP server 110. The model text commands may further comprise variants of text commands an end-user may provide in response to a command context. The model text commands may be indexed, ordered, etc. by text strings that represent a relevant command context.

The transcription library 224 may store text commands and command contexts. Each item of data stored in the transcription library 224 may represent a text command created by an NLP command creator, and reviewed by NLP command reviewers, using the techniques described herein. The transcription library 224 may be provided to the end-user deployment engine 114, during the end-user deployment phase of the natural language processing environment 100, as discussed further herein.

The Natural Language Processing Environment 100 in Operation

The natural language processing environment 100 may operate to provide NLP command creators with command contexts through a first crowdsourced job, and receive text commands in response to the first crowdsourced job. The natural language processing environment 100 may also operate to select NLP command reviewers for second and third crowdsourced jobs. In the second crowdsourced job, a first group of NLP command reviewers review the text commands provided by NLP command creators for syntax errors. In the third crowdsourced job, a second group of NLP command reviewers compare the text commands provided by NLP command creators with model text commands for the relevant command context.

Operation when Collecting Text Commands in Response to Command Contexts

Figure 3:
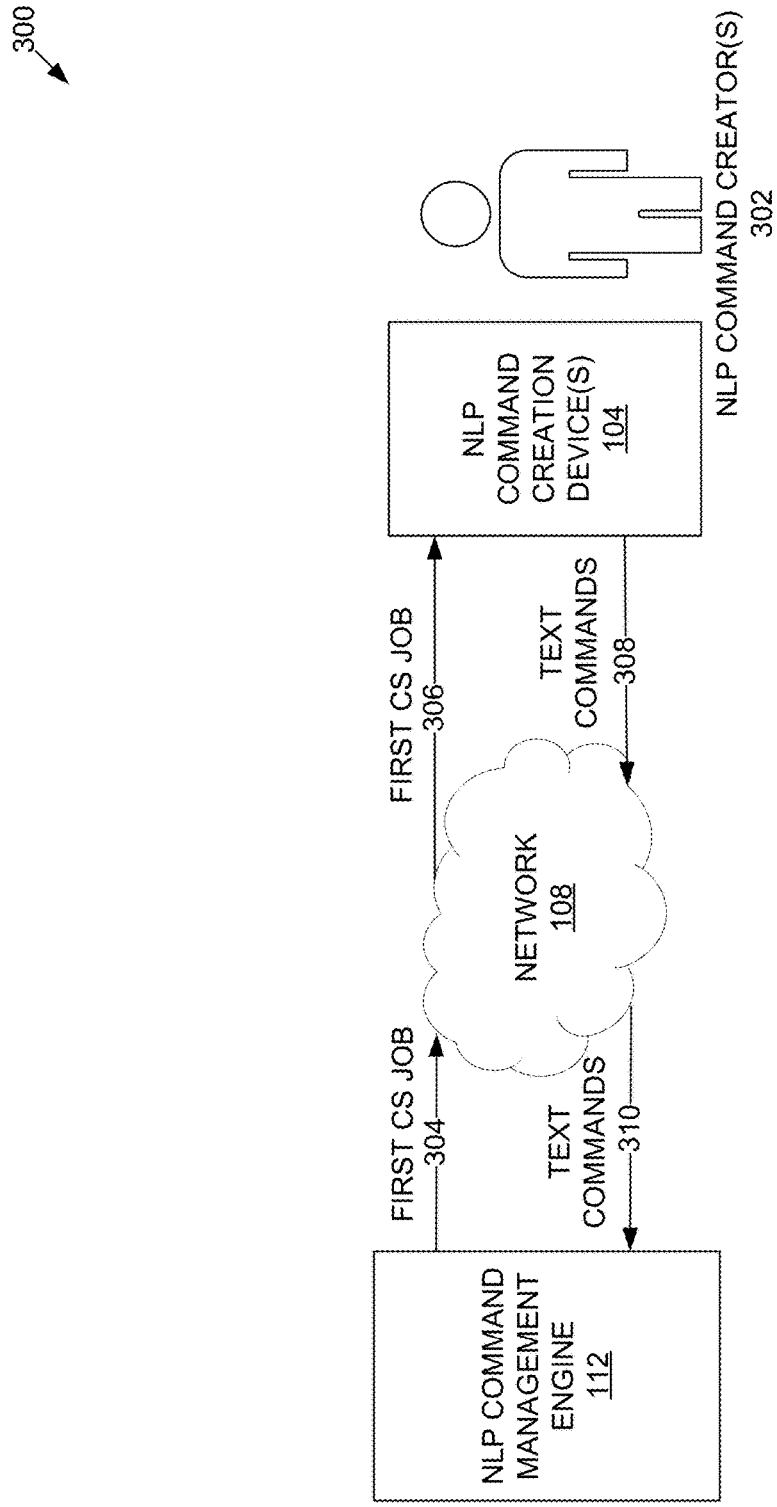
FIG. 3 illustrates a block diagram of an example of a data flow relating to operation of the natural language processing environment during the training phase, according to some implementations.

FIG. 3 illustrates a block diagram of an example of a data flow 300 relating to operation of the natural language processing environment during the training phase, according to some implementations. FIG. 3 may include the NLP command management engine 112, the network 108, the NLP command creation device(s) 104, and NLP command creator(s) 302.

In an implementation, the NLP command management engine 112 selects the NLP command creator(s) 302, and selects a command context. The NLP command management engine 112 may create a first crowdsourced job that incorporates instructions for the NLP command creator(s) 302 to provide text commands for the command context. At an operation 304, the first crowdsourced job is deployed to the network 108. At an operation 306, the first crowdsourced job is received by the NLP command creation device(s) 104. The NLP command creation device(s) 104 may display the command context to the NLP command creator(s) 302, and may request the NLP command creator(s) 302 to provide text commands for the command context.

At an operation 308, the NLP command creation device(s) 104 may provide the text commands to the network 108. At an operation 310, the NLP command management engine 112 may receive the text commands. The NLP command management engine 112 may create additional crowdsourced jobs for NLP command reviewers to review the text commands using the techniques described herein.

Operation when Reviewing Text Commands

Figure 4:
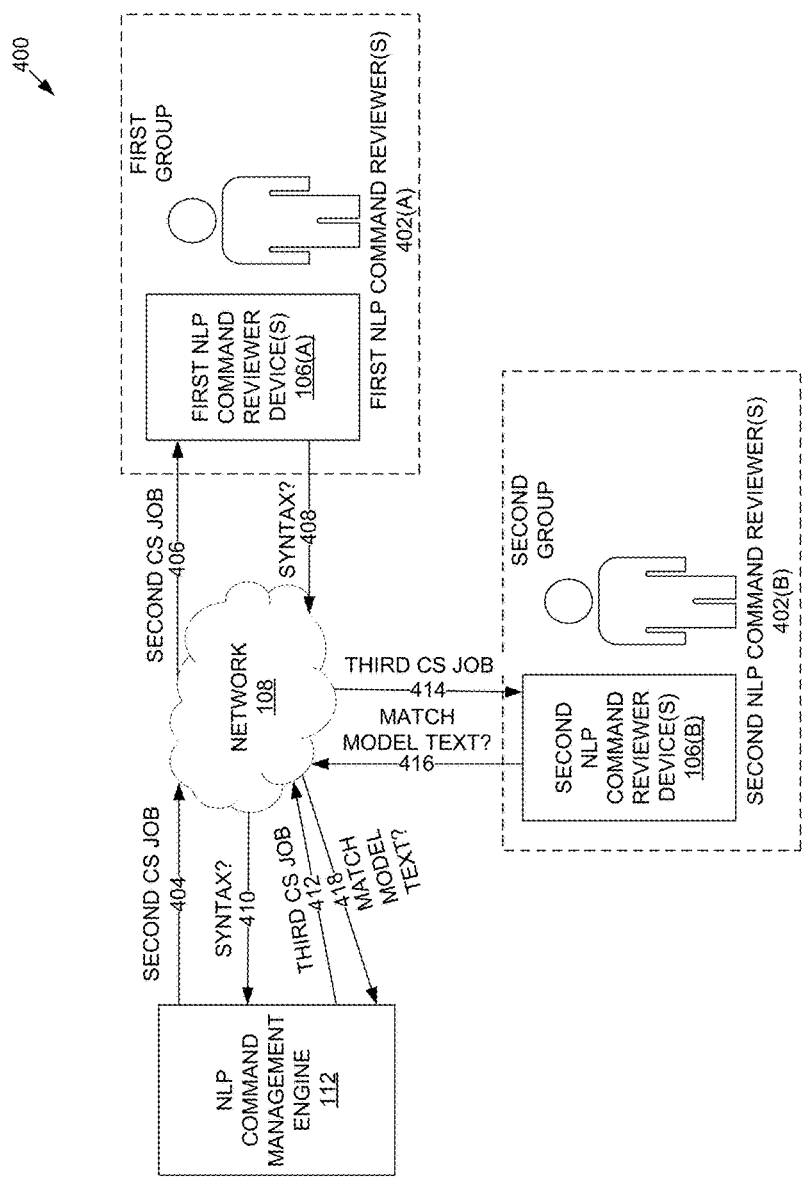
FIG. 4 illustrates a block diagram of an example of a data flow relating to operation of the natural language processing environment during the training phase, according to some implementations.

FIG. 4 illustrates a block diagram of an example of a data flow 400 relating to operation of the natural language processing environment during the training phase, according to some implementations. FIG. 4 may include the NLP command management engine 112, the network 108, first NLP command reviewer device(s) 106(*a*), first NLP command reviewer(s) 402(*a*), second NLP command reviewer device(s) 106(*b*), and second NLP command reviewer(s) 402(*b*).

In some implementations, the NLP command management engine 112 selects text commands to be reviewed. The NLP command management engine 112 may further incorporate the text commands into a second crowdsourcing job for the first NLP command reviewer(s) 402(*a*). At an operation 404, the NLP command management engine 112 may provide the second crowdsourced job to the network 108. At an operation 406, the first NLP command reviewing device(s) 106(*a*) may receive the second crowdsourced job. The first NLP command reviewing device(s) 106(*a*) may ask the first NLP command reviewer(s) 402(*a*) to determine whether the text commands are syntactically correct. At an operation 408, the first NLP command reviewing device(s) 106(*a*) may provide a determination of whether the text commands are syntactically correct to the network 108. At an operation 410, the NLP command management engine 112 may receive the determination of whether the text commands are syntactically correct.

The NLP command management engine 112 may further select a second group of NLP command reviewers for a third crowdsourced job. The third crowdsourced job may ask the second group to determine whether the text command is sufficiently similar to model text commands for the command context. At an operation 412, the NLP command management engine 112 sends the third crowdsourced job to the network 108. At an operation 414, the second NLP command reviewer device(s) 106(*b*) may receive the third crowdsourced job. The second NLP command reviewer device(s) 106(*b*) may ask the second NLP command reviewer(s) 402(*b*) to determine whether the text command is sufficiently similar to model text commands for the command context. At an operation 416, the second NLP command reviewer device(s) 106(*b*) send a response to this determination to the network 108. At an operation 418, the NLP command management engine 112 may receive the response to this determination from the network 108. The NLP command management engine 112 may use this determination to store text variants that pass both the second and the third crowdsourced jobs, as discussed further herein.

Figure 5:
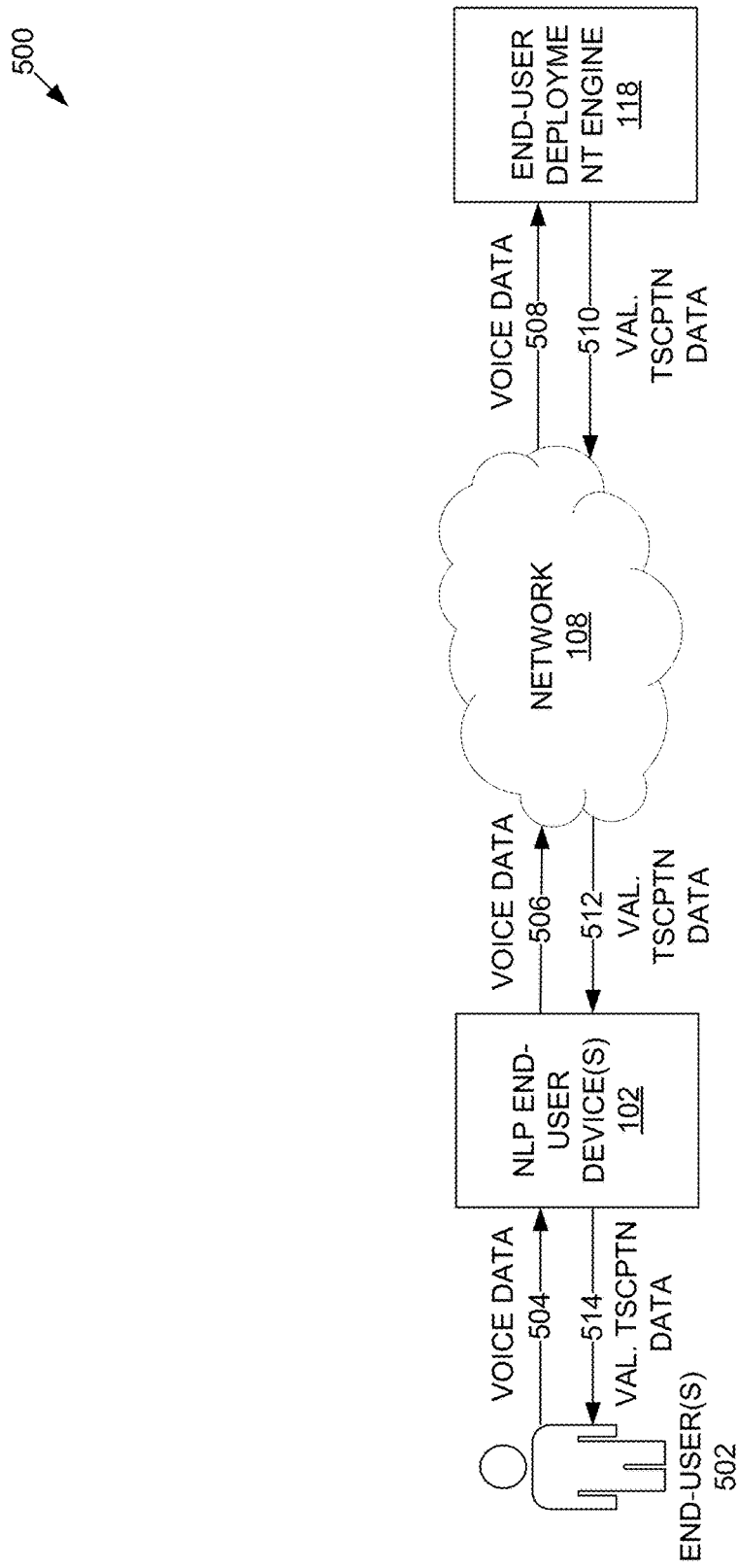
FIG. 5 illustrates a block diagram of an example of a data flow relating to operation of the natural language processing environment during the end-user deployment phase, according to some implementations.

FIG. 5 illustrates a block diagram of an example of a data flow 500 relating to operation of the natural language processing environment 100 during the end-user deployment phase, according to some implementations. FIG. 5 includes end-user(s) 502, the NLP end-user device 102, the network 108, and the end-user deployment engine 118.

At an operation 504, the end-user(s) 502 provide voice data to the NLP end-user device(s) 102. The NLP end-user device(s) 102 may capture the voice data using an audio input device thereon. The NLP end-user device(s) 102 may incorporate the voice data into network-compatible data transmissions, and at an operation 506, may send the network-compatible data transmissions to the network 108.

At an operation 508, the end-user deployment engine 118 may receive the network-compatible data transmissions. The end-user deployment engine 118 may further extract and transcribe the voice data using trained transcription libraries stored in the end-user deployment engine 118. More specifically, the end-user deployment engine 118 may identify validated transcription data corresponding to the voice data in trained transcription libraries. The end-user deployment engine 118 may incorporate the validated transcription data into network-compatible data transmissions. At an operation 510, the end-user deployment engine 118 may provide the validated transcription data to the network 108.

At an operation 512, the NLP end-user device(s) 102 may receive the validated transcription data. The NLP end-user device(s) 102 may further extract the validated transcription data from the network-compatible transmissions. At an operation 514, the NLP end-user device(s) 102 provide the validated transcription data to the end-user(s) 502. In some implementations, the NLP end-user device(s) 102 display the validated transcription data on a display component (e.g., a screen). The NLP end-user device(s) 502 may also use the validated transcription data internally (e.g., in place of keyboard input for a specific function or in a specific application/document).

Figure 6:
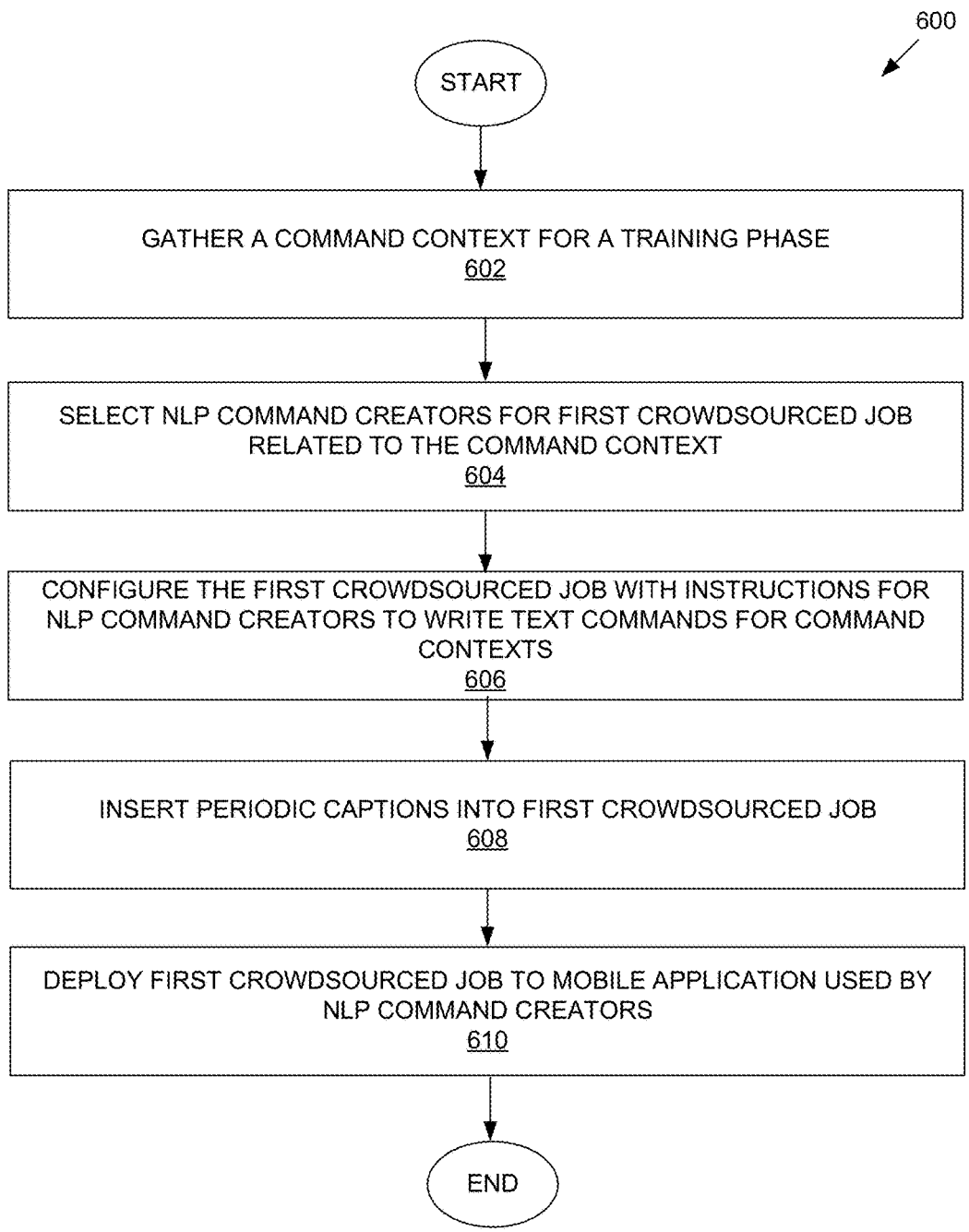
FIG. 6 illustrates a flowchart of a process for gathering from NLP command creators text commands for command contexts, according to some implementations.

FIG. 6 illustrates a flowchart of a process 600 for gathering from NLP command creators text commands for command contexts, according to some implementations. The process 600 is discussed in conjunction with the NLP command management engine 112 discussed herein. It is noted other structures may perform the process 600, and that the process 600 may include more or less operations than explicitly shown in FIG. 6.

At an operation 602, command contexts may be gathered for a training phase of the natural language processing environment 100. In some implementations, the command creation management engine 206 gathers command context data from the command context data datastore 214. The command context data may relate to a command context specified by an administrator, manager, etc. of the NLP server 110. The command context data may relate to a command context related to vehicles (directions, speed, or other parameters to control a vehicle, etc.), a command context related to health care, a command context related to a military and/or law enforcement application, a command context related to telephony, a command context related to helping people with disabilities (e.g., instructions for an application for the blind), etc. In some implementations, the command context may relate to instructions to control an application, process, etc. or instructions to search networked resources.

At an operation 604, NLP command creators are selected to for a first crowdsourced job related to the command context. In some implementations, the command creation management engine 206 may instruct the user management engine 208 to identify user account data for people selected to be NLP command creators. The user management engine 208 may retrieve relevant user account data from the user account data datastore 216. The user management engine 208 may also provide the user account data of the NLP command creators to the command creation management engine 206.

At an operation 606, the first crowdsourced job may be configured with instructions for the NLP command creators to write text commands for the command contexts. More specifically, the command creation management engine 206 may configure the first crowdsourced job with a script that provides the command context alongside a data structure configured to receive text for the text commands.

At an operation 608, periodic captions may be inserted into the first crowdsourced job. In an implementation, the command creation management engine 206 may gather non-machine readable captions (e.g., CAPTCHA captions or audio-challenges that require a human being to interpret) from the caption data datastore 218. The command creation management engine 206 may incorporate these non-machine readable captions into the first crowdsourced job for the NLP command creators selected for the first crowdsourced job.

At an operation 610, the first crowdsourced job may be deployed to a mobile application used by the NLP command creators. In some implementations, the command creation management engine 206 may provide the first crowdsourced job to the mobile application management engine 204. The mobile application management engine 204 may incorporate the first crowdsourced job into the mobile application on the NLP command creation device(s) 104. In various implementations, the mobile application management engine 204 incorporates the instructions for the NLP command creators to write text commands for the command contexts and/or the periodic captions into specific screens of the mobile application. The mobile application management engine 204 may receive text commands in response to the first crowdsourced job, as described further herein. The process 600 may subsequently terminate.

Figure 7:
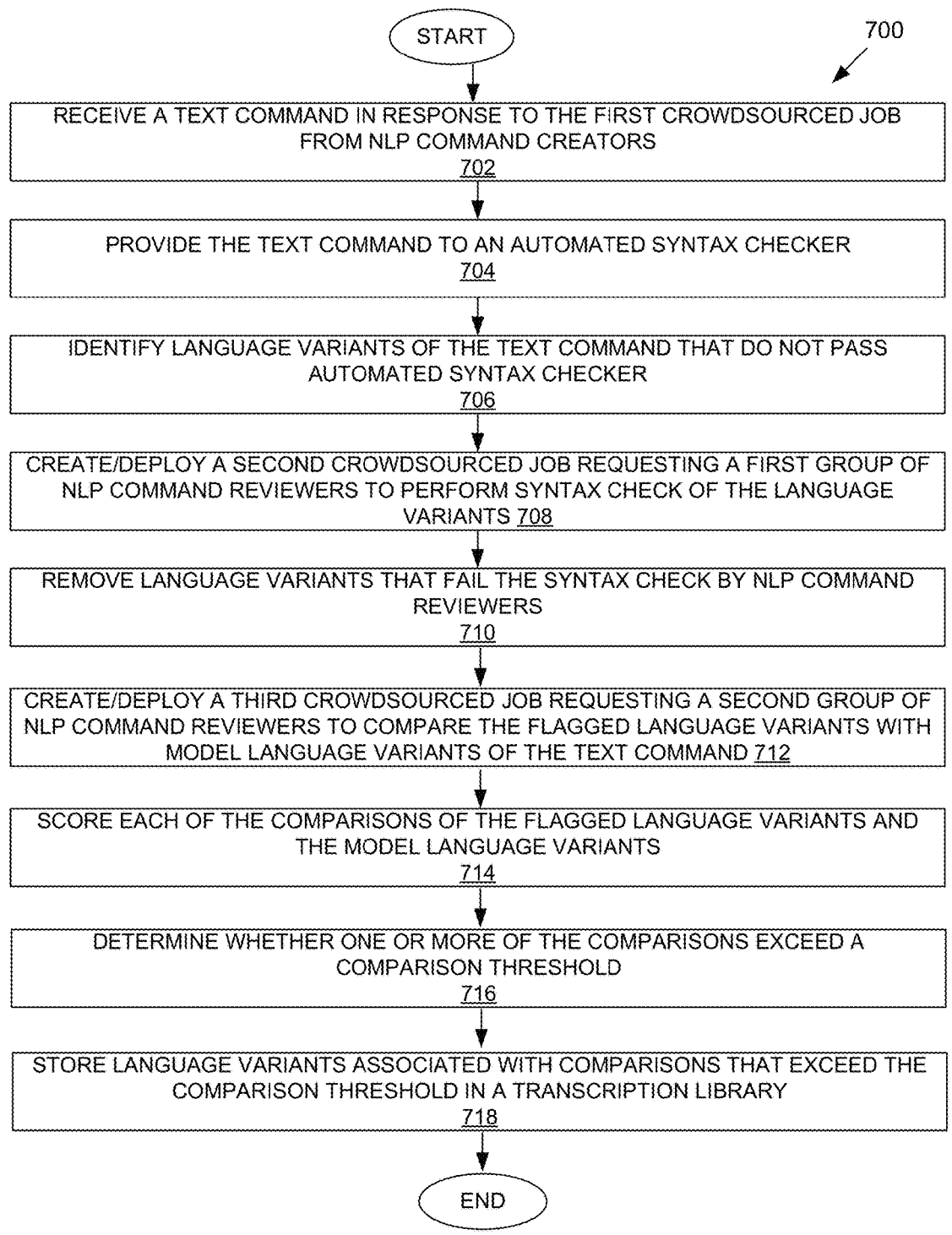
FIG. 7 illustrates a flowchart of a process for instructing NLP command reviewers to review text commands for command contexts, according to some implementations.

FIG. 7 illustrates a flowchart of a process 700 for instructing NLP command reviewers to review text commands for command contexts, according to some implementations. The process 700 is discussed in conjunction with the NLP command management engine 112 discussed herein. It is noted other structures may perform the process 700, and that the process 700 may include more or less operations than explicitly shown in FIG. 7.

At an operation 702, a text response to the first crowdsourced job may be received from the NLP command creators. In various implementations, the mobile application management engine 204 may receive text commands NLP command creators entered into the mobile application on the NLP command creation device(s) 104. The mobile application management engine 204 may provide these text commands to the other modules of the NLP command management engine 112 for further processing. For example, in an implementation, the mobile application management engine 204 provides the text commands to the syntax engine 210.

At an operation 704, the text command may be provided to an automated syntax checker. More specifically, the mobile application management engine 204 may provide the text command to the syntax engine 210. The syntax engine 210 may evaluate the text commands for syntax errors in accordance with the dictionary data in the dictionary data datastore 220. In some implementations, the syntax engine 210 checks the text commands for spelling, grammar, and/or other syntax errors. The syntax engine 210 may provide whether specific text commands pass the syntax check to other modules of the NLP command management engine 112, such as the command review management engine 212.

At an operation 706, language variants of the text command that do not pass the automated syntax checker may be identified. More particularly, the command review management engine 212 may identify language variants of the text command that fail spelling, grammar, and other syntax checks. As discussed further herein, these variants of the text commands may be used to form the basis of additional crowdsourced jobs.

At an operation 708, a second crowdsourced job requesting a first group of NLP command reviewers to perform a syntax check of the language variants may be created and/or deployed. The command review management engine 212 may create a second crowdsourced job that selects a first group of the NLP command reviewers, and instructs the first group of NLP command reviewers to check the syntax of the language variants. The mobile application management engine 204 may instruct the mobile application on the NLP command review device(s) 106 to display on the NLP command review device(s) 106 a text editing window that allows the NLP command reviewers to manually check syntax of the language variants. Doing so allows people, rather than a machine, to review whether a text command contains a known variant of a word (e.g., "sup" instead of "what's up") or contains a syntax error. The mobile application management engine 204 may receive responses from the first group of the NLP command reviewers.

At an operation 710, language variants that fail the syntax check by NLP command reviewers may be removed. More particularly, the command review management engine 212 may remove language variants that fail the syntax check by NLP command reviewers may be removed. As discussed herein, these language variants have been identified as containing syntax errors by both automated syntax checkers (e.g., the syntax engine 210) and by people (e.g. the first group of NLP command reviewers). As a result, these language variants can be removed with a high confidence that they contain syntax errors.

At an operation 712, a third crowdsourced job requesting a second group of NLP command reviewers to compare the flagged language variants with model language variants of the text command may be created and/or deployed. In some implementations, the command review management engine 212 creates a third crowdsourced job, and selects a second group of NLP command reviewers for the third crowdsourced job. The command review management engine 212 may gather model text commands from the model text command data and may provide the model text commands, along with the text command provided by the NLP command creator, to the second group of NLP command reviewers. The mobile application management engine 204 may incorporate the model commands alongside the text command provided by the NLP command creator in a window in the mobile application on the NLP command reviewer device(s) 106. In some implementations, NLP command reviewers are provided (a) the command context, and (b) a side-by-side comparison of the model text commands and the text command provided by the NLP command creator. NLP command reviewers may be given the option to select whether the text command provided by the NLP command creator is sufficiently similar to model text commands given the command context. The mobile application management engine 204 may responses to the third crowdsourcing job, and may provide these responses to the command review management engine 212.

At an operation 714, each of the comparisons of the flagged language variants and the model language variants may be scored. The command review management engine 212 may assign scores as to whether the second group of the NLP command reviewers found text command provided by the NLP command creator is sufficiently similar to model text commands given the command context. At an operation 716, it may be determined whether one or more of the comparisons exceed a comparison threshold. More particularly, the command review management engine 212 may make the determination about whether a threshold has been exceeded.

At an operation 718, the language variants associated with comparisons that exceed the comparison threshold may be stored in a transcription library. In some implementations, the command review management engine 212 may store the language variants associated with comparisons that exceed the comparison threshold in the transcription library 224. The process 700 may subsequently terminate.

Figure 8:
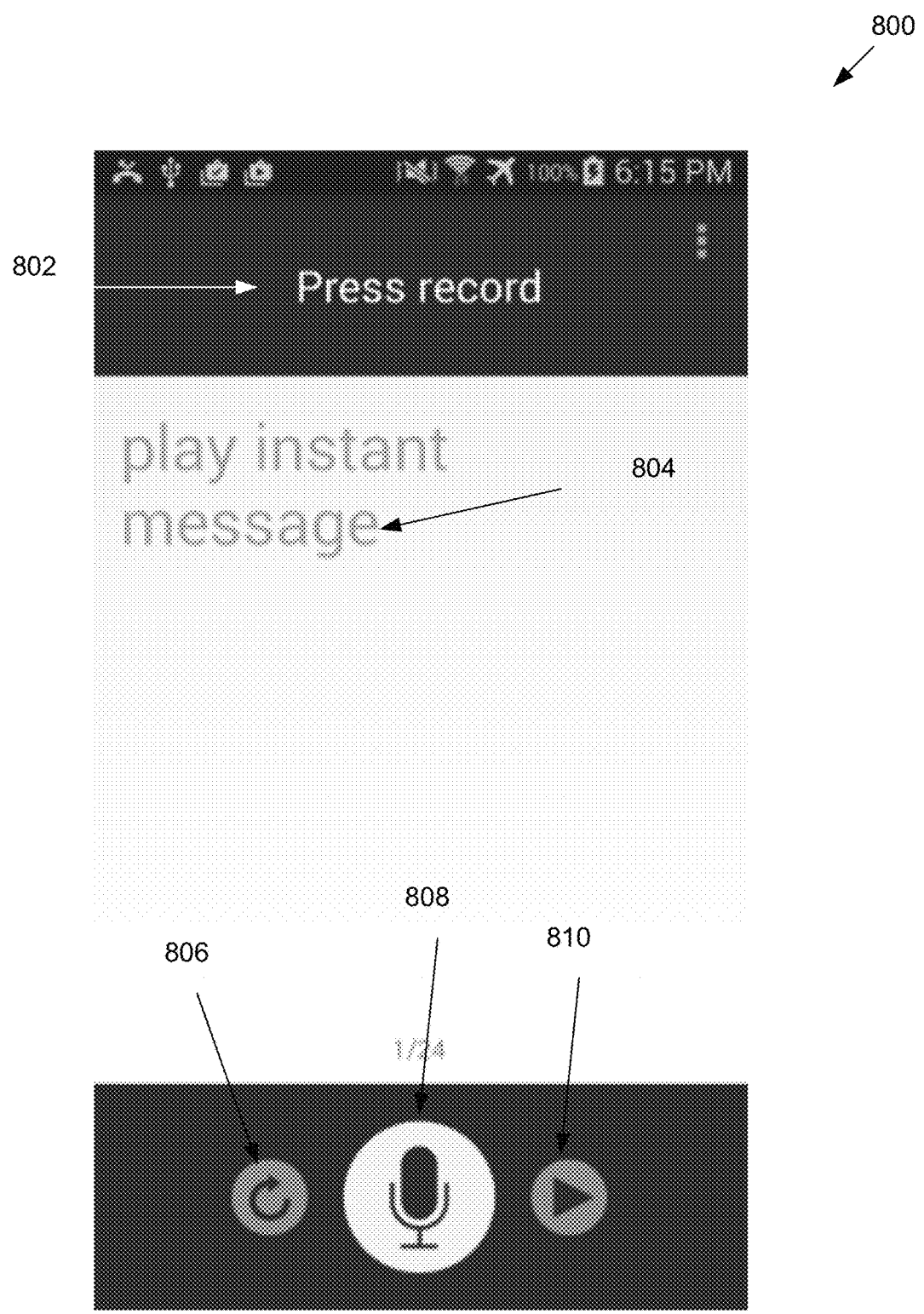
FIG. 8 illustrates a screenshot of a screen of a mobile application of one of the NLP training device(s), according to some implementations.

FIG. 8 illustrates a screenshot 800 of a screen of a mobile application of one of the NLP training device(s) 104, according to some implementations. The screen in FIG. 8 may include a recording banner 802, a display area 804, an erase button 806, a record button 808, and a play button 810. In various implementations, the recording banner 802 and the display area 804 may display one or more predetermined prompts to an NLP trainer during a training phase of the natural language processing environment 100. The erase button 806 may allow the NLP trainer to erase voice data that the NLP trainer has previously recorded. The record button 808 may allow the NLP trainer to record voice data. The play button 810 may allow the NLP trainer to play voice that that the NLP trainer has recorded.

In some implementations, the screen in FIG. 8 is provided to an NLP trainer as part of a training phase of the natural language processing environment 100. More specifically, when an NLP trainer logs into the mobile application, the NLP trainer may receive a unique identification token than is mapped to a specific collection of prompts and audits to be used. Upon entering the identification token, the NLP trainer may be guided through an arbitrary number of prompts. The NLP training device(s) 104 may provide the voice data to NLP server 110 using the techniques described herein. In some implementations, the NLP trainer may be provided with one or more audits (e.g., gold standard questions, captions that are not machine-readable, audio that is not understandable to machines, etc.). Upon completing a session, the NLP trainer may be provided with a completion code that the NLP trainer can use for a variety of purposes, such as obtaining compensation for the jobs the NLP trainer has performed.

Figure 9:
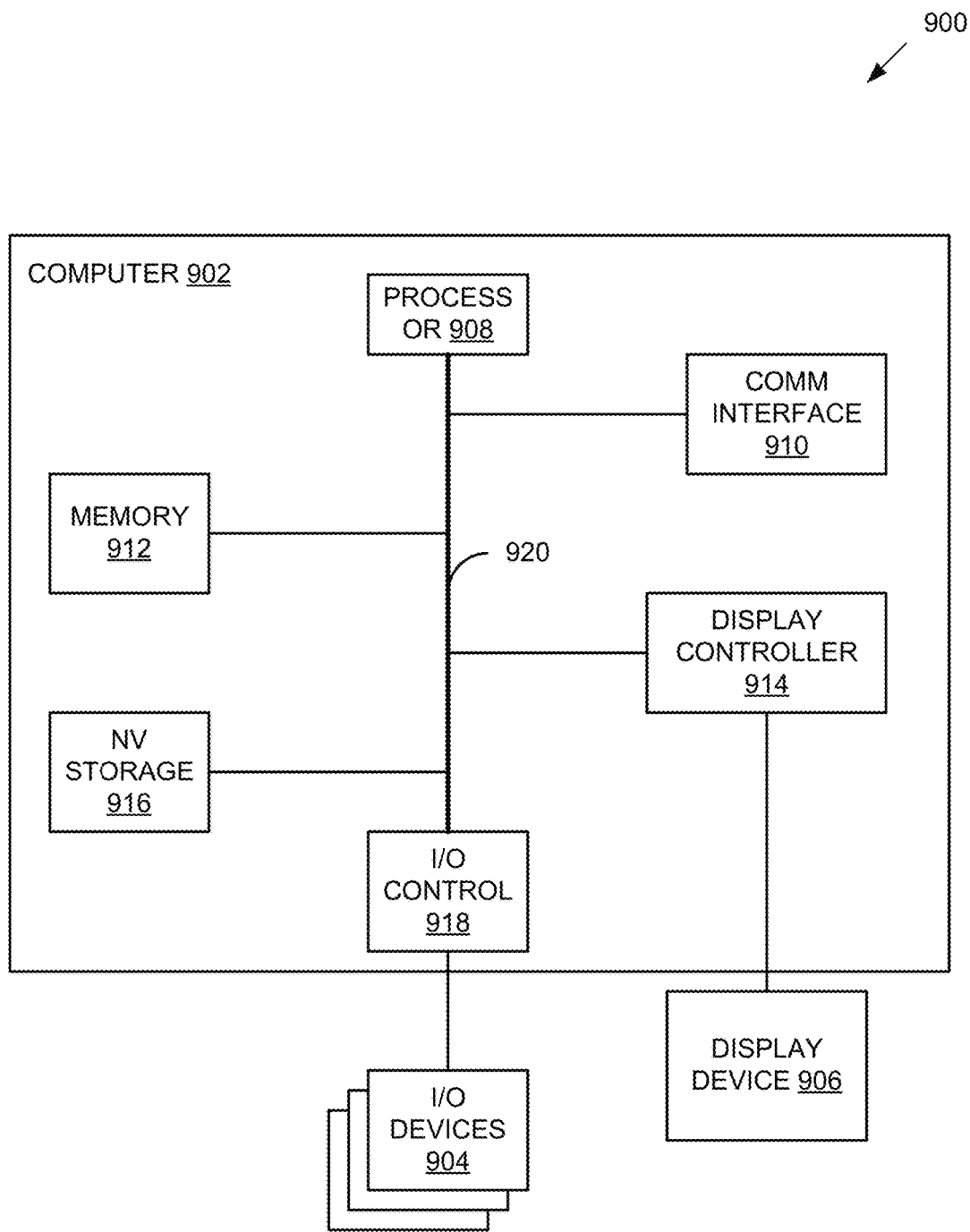
FIG. 9 shows an example of a computer system, according to some implementations.

FIG. 9 shows an example of a computer system 900, according to some implementations. In the example of FIG. 9, the computer system 900 can be a conventional computer system that can be used as a client computer system, such as a wireless client or a workstation, or a server computer system. The computer system 900 includes a computer 902, I/O devices 904, and a display device 906. The computer 902 includes a processor 908, a communications interface 910, memory 912, display controller 914, non-volatile storage 916, and I/O controller 918. The computer 902 can be coupled to or include the I/O devices 904 and display device 906.

The computer 902 interfaces to external systems through the communications interface 910, which can include a modem or network interface. It will be appreciated that the communications interface 910 can be considered to be part of the computer system 900 or a part of the computer 902. The communications interface 910 can be an analog modem, ISDN modem, cable modem, token ring interface, satellite transmission interface (e.g. "direct PC"), or other interfaces for coupling a computer system to other computer systems.

The processor 908 can be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, to the display controller 914, and to the I/O controller 918.

The I/O devices 904 can include a keyboard, disk drives, printers, a scanner, and other input and output devices, including a mouse or other pointing device. The display controller 914 can control in the conventional manner a display on the display device 906, which can be, for example, a cathode ray tube (CRT) or liquid crystal display (LCD). The display controller 914 and the I/O controller 918 can be implemented with conventional well known technology.

The non-volatile storage 916 is often a magnetic hard disk, an optical disk, or another form of storage for large amounts of data. Some of this data is often written, by a direct memory access process, into memory 912 during execution of software in the computer 902. One of skill in the art will immediately recognize that the terms "machine-readable medium" or "computer-readable medium" includes any type of storage device that is accessible by the processor 908 and also encompasses a carrier wave that encodes a data signal.

The computer system 900 is one example of many possible computer systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it can lack some of the features shown in FIG. 9, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein.

What is claimed is:

1. A computer-implemented method for eliciting command variants from crowd users to train a natural language processing system, the method being implemented in a computer system having one or more physical processors programmed with computer program instructions that, when executed by the one or more physical processors, cause the computer system to perform the method, the method comprising:

identifying a computer recognized command to be processed by a computer;

generating at least a first task, wherein the first task includes command creation instructions that prompt a user to input a variant of the computer recognized command;

transmitting the first task to a plurality of users via a network;

receiving, from at least a first user among the plurality of users, a first user-defined variant of the computer recognized command;

receiving, from at least a second user among the plurality of users, a second user-defined variant of the computer recognized command;

storing the first user-defined variant and the second user-defined variant in association with the computer recognized command;

generating at least a second task, wherein the second task includes command review instructions that prompt a given user to verify the first user-defined variant;

transmitting the second task to a second plurality of users via the network;

receiving, from at least a second user among the second plurality of users, a verification of the first user-defined variant; and training the natural language processing system to recognize variants of the computer recognized command based on the verified first user-defined variant and the second user-defined variant.

2. The method of claim 1, wherein the first task configures a first application executing on a command creation device to display a plurality of computer recognized commands, and to capture, for each of the plurality of computer recognized commands, a plurality of user-defined variants.

3. The method of claim 1, wherein the first task configures the first application to periodically display a non-machine readable caption on the first application.

4. The method of claim 1, wherein the non-machine readable caption comprises one or more of a non-machine readable image and a non-machine readable sound bite.

5. The method of claim 1, wherein the command review instructions instruct the second plurality of users to review the syntax of the first user-defined variant.

6. The method of claim 1, wherein the command review instructions instruct the second plurality of users to compare the first user-defined variant with model text language variants for the computer recognized command.

7. The method of claim 6, wherein the command review instructions further includes the first user-defined variant and the computer recognized command alongside the model text language variants, the method further comprising:

receiving an indication from each of the second plurality of users of whether the first user-defined variant is similar to one of the model text language variants.

8. The method of claim 1, further comprising checking syntax of the first user-defined variant.

9. The method of claim 1, wherein storing the first user-defined variant and the second user-defined variant comprises storing the first user-defined variant and the second user-defined variant in a transcription library.

10. The method of claim 1, further comprising using the first user-defined variant and the second user-defined variant for transcription of voice data during an end-user deployment phase of the natural language processing system.

11. The method of claim 1, further comprising:

counting a number of times that a given user-defined variant of the computer recognized command has been received from the plurality of users;

determining that the number of times exceeds a threshold number;

preventing further tasks from accepting the given user-defined variant as a variant of the computer recognized command responsive to the determination that the number of times exceeds the threshold number so as to elicit other user-defined variants of the computer recognized command.

12. The method of claim 1, wherein transmitting the first task to the plurality of users comprises transmitting the first task via a crowd sourced job.

13. A system for eliciting command variants from crowd users to train a natural language processing system comprising:

a memory;

one or more physical processors programmed with one or more computer program instructions which, when executed, cause the one or more physical processors to:

identify a computer recognized command to be processed by a computer;

generate at least a first task, wherein the first task includes command creation instructions that prompt a user to input a variant of the computer recognized command;

transmit the first task to a plurality of users via a network;

receive, from at least a first user among the plurality of users, a first user-defined variant of the computer recognized command;

receive, from at least a second user among the plurality of users, a second user-defined variant of the computer recognized command; and store the first user-defined variant and the second user-defined variant in association with the computer recognized command;

generate at least a second task, wherein the second task includes command review instructions that prompt a given user to verify the first user-defined variant;

transmit the second task to a second plurality of users via the network;

receive, from at least a second user among the second plurality of users, a verification of the first user-defined variant; and train the natural language processing system to recognize variants of the computer recognized command based on the verified first user-defined variant and the second user-defined variant.

14. The system of claim 13, wherein the first task configures a first application executing on a command creation device to display a plurality of computer recognized commands, and to capture, for each of the plurality of computer recognized commands, a plurality of user-defined variants.

15. The system of claim 13, wherein the first task configures the first application to periodically display a non-machine readable caption on the first application.

16. The system of claim 13, wherein the non-machine readable caption comprises one or more of a non-machine readable image and a non-machine readable sound bite.

17. The system of claim 13, wherein the command review instructions instruct the second plurality of users to review the syntax of the first user-defined variant.

18. The system of claim 13, wherein the command review instructions instruct the second plurality of users to compare the first user-defined variant with model text language variants for the computer recognized command.

19. The system of claim 18, wherein the command review instructions further includes the first user-defined variant and the computer recognized command alongside the model text language variants, and wherein the instructions which, when executed, further cause the one or more physical processors to receive an indication from each of the second plurality of users of whether the first user-defined variant is similar to one of the model text language variants.

20. The system of claim 13, further comprising checking syntax of the first user-defined variant.

21. The system of claim 13, wherein to store the first user-defined variant and the second user-defined variant, the one or more physical processors are further cause to store the first user-defined variant and the second user-defined variant in a transcription library.

22. The system of claim 13, wherein the instructions which, when executed, further cause the one or more physical processors to use the first user-defined variant and the second user-defined variant for transcription of voice data during an end-user deployment phase of the natural language processing system.

23. A computer program product comprising:
one or more tangible, non-transitory computer-readable storage devices;
program instructions, stored on at least one of the one or more tangible, non-transitory computer-readable tangible storage devices that, when executed, cause a computer to:
identify a computer recognized command to be processed by a computer;
generate at least a first task, wherein the first task includes command creation instructions that prompt a user to input a variant of the computer recognized command;
transmit the first task to a plurality of users via a network;
receive, from at least a first user among the plurality of users, a first user-defined variant of the computer recognized command;
receive, from at least a second user among the plurality of users, a second user-defined variant of the computer recognized command;
store the first user-defined variant and the second user-defined variant in association with the computer recognized command;
generate at least a second task, wherein the second task includes command review instructions that prompt a given user to verify the first user-defined variant;
transmit the second task to a second plurality of users via the network;
receive, from at least a second user among the second plurality of users, a verification of the first user-defined variant; and
train the natural language processing system to recognize variants of the computer recognized command based on the verified first user-defined variant and the second user-defined variant.

\* \* \* \* \*